(12) United States Patent
Chawla et al.

(10) Patent No.: US 7,877,492 B2
(45) Date of Patent: Jan. 25, 2011

(54) SYSTEM AND METHOD FOR DELEGATING A USER AUTHENTICATION PROCESS FOR A NETWORKED APPLICATION TO AN AUTHENTICATION AGENT

(75) Inventors: Rajeev Chawla, Union City, CA (US); Marco Framba, Cupertino, CA (US); Venky Talla, Fremont, CA (US); Tom Speeter, San Ramon, CA (US)

(73) Assignee: WebMD Corporation, Atlanta, GA (US)

( * ) Notice: Subject to any disclaimer, the term of this patent is extended or adjusted under 35 U.S.C. 154(b) by 197 days.

(21) Appl. No.: 10/787,983

(22) Filed: Feb. 26, 2004

(65) Prior Publication Data

US 2004/0168090 A1  Aug. 26, 2004

Related U.S. Application Data

(63) Continuation of application No. 09/626,339, filed on Jul. 26, 2000, now abandoned.

(60) Provisional application No. 60/158,939, filed on Oct. 12, 1999.

(51) Int. Cl.
*G06F 15/16* (2006.01)
*G06F 7/04* (2006.01)
*H04L 9/00* (2006.01)

(52) U.S. Cl. ............... 709/229; 709/217; 709/219; 713/155; 726/4

(58) Field of Classification Search ......... 709/201–253; 713/150–194; 726/12, 4
See application file for complete search history.

(56) References Cited

U.S. PATENT DOCUMENTS

| 4,315,309 A | 2/1982 | Coli .......................... 705/3 |
| 4,812,994 A | 3/1989 | Taylor et al. ............ 705/410 |
| 4,858,121 A | 8/1989 | Barber et al. ............. 705/2 |
| 4,868,376 A | 9/1989 | Lessin et al. ............ 235/492 |
| 4,882,474 A | 11/1989 | Anderl et al. ........... 235/380 |
| 4,916,611 A | 4/1990 | Doyle, Jr. et al. ......... 705/2 |
| 4,949,251 A | 8/1990 | Griffen et al. .......... 714/20 |
| 4,960,982 A | 10/1990 | Takahira ................ 235/382 |
| 4,984,272 A | 1/1991 | McIlroy et al. .......... 713/202 |
| 5,150,409 A | 9/1992 | Elsner .................... 713/177 |
| 5,235,642 A * | 8/1993 | Wobber et al. ........... 713/156 |
| 5,241,671 A | 8/1993 | Reed et al. ............. 707/104.1 |

(Continued)

*Primary Examiner*—J Bret Dennison
(74) *Attorney, Agent, or Firm*—Wilmer Cutler Pickering Hale & Dorr LLP

(57) ABSTRACT

A system and method for delegating a user authentication process for a networked application to an authentication proxy. A networked application may request a user to provide authentication information in order to access the application. Upon receiving this authentication information from the user, the client side of the networked application sends the information to the server side of the networked application. The server side of the application may then determine an appropriate authentication agent associated with the user to delegate the authentication process to. For example, for each application user, the server side of the application may maintain information associated with the user, such as the user's employer. The application may then match this employer information to an authentication agent running in the employer's network domain, and the authentication process may then be delegated to this authentication agent.

14 Claims, 4 Drawing Sheets

U.S. PATENT DOCUMENTS

| | | | |
|---|---|---|---|
| 5,251,152 A | 10/1993 | Notess | 709/224 |
| 5,301,105 A | 4/1994 | Cummings, Jr. | 705/2 |
| 5,301,246 A | 4/1994 | Archibald et al. | 379/142.06 |
| 5,325,294 A | 6/1994 | Keene | 705/3 |
| 5,327,341 A | 7/1994 | Whalen et al. | 705/3 |
| 5,430,875 A | 7/1995 | Ma | 719/318 |
| 5,465,082 A | 11/1995 | Chaco | 340/825.49 |
| 5,491,800 A | 2/1996 | Goldsmith et al. | 709/221 |
| 5,550,971 A | 8/1996 | Brunner et al. | 395/161 |
| 5,559,885 A | 9/1996 | Drexler et al. | 235/380 |
| 5,559,888 A | 9/1996 | Jain et al. | 380/25 |
| 5,560,008 A | 9/1996 | Johnson et al. | 713/201 |
| 5,572,422 A | 11/1996 | Nematbakhsh et al. | 705/3 |
| 5,586,260 A * | 12/1996 | Hu | 726/12 |
| 5,588,148 A | 12/1996 | Landis et al. | 707/1 |
| 5,629,981 A | 5/1997 | Nerlikar | 713/168 |
| 5,664,109 A | 9/1997 | Johnson et al. | 705/2 |
| 5,664,207 A | 9/1997 | Crumpler et al. | 715/505 |
| 5,772,585 A | 6/1998 | Lavin et al. | 600/300 |
| 5,774,650 A * | 6/1998 | Chapman et al. | 726/7 |
| 5,790,785 A | 8/1998 | Klug et al. | 713/202 |
| 5,809,476 A | 9/1998 | Ryan | 705/2 |
| 5,815,665 A | 9/1998 | Teper et al. | 709/229 |
| 5,827,180 A | 10/1998 | Goodman | 600/300 |
| 5,832,488 A | 11/1998 | Eberhardt | 707/10 |
| 5,841,970 A * | 11/1998 | Tabuki | 726/2 |
| 5,845,255 A | 12/1998 | Mayaud | 705/3 |
| 5,848,397 A | 12/1998 | Marsh et al. | 705/14 |
| 5,857,190 A | 1/1999 | Brown | 707/10 |
| 5,862,327 A | 1/1999 | Kwang et al. | 709/203 |
| 5,867,821 A | 2/1999 | Ballantyne et al. | 705/2 |
| 5,898,780 A * | 4/1999 | Liu et al. | 713/155 |
| 5,903,889 A | 5/1999 | De la Huerga et al. | 707/3 |
| 5,905,884 A | 5/1999 | Williams | 709/227 |
| 5,915,240 A | 6/1999 | Karpf | 705/2 |
| 5,923,756 A * | 7/1999 | Shambroom | 713/156 |
| 5,953,704 A | 9/1999 | McIlroy et al. | 705/2 |
| 5,960,403 A | 9/1999 | Brown | 705/2 |
| 5,966,715 A | 10/1999 | Sweeney et al. | 707/203 |
| 5,967,789 A | 10/1999 | Segel et al. | 434/236 |
| 5,974,412 A | 10/1999 | Hazlehurst et al. | 707/3 |
| 5,978,842 A | 11/1999 | Noble et al. | 709/218 |
| 6,006,269 A | 12/1999 | Phaal | 709/227 |
| 6,018,619 A | 1/2000 | Allard et al. | 709/224 |
| 6,031,818 A | 2/2000 | Lo et al. | 370/216 |
| 6,070,160 A | 5/2000 | Geary | 707/4 |
| 6,070,243 A * | 5/2000 | See et al. | 726/2 |
| 6,073,106 A | 6/2000 | Rosen et al. | 705/3 |
| 6,073,163 A | 6/2000 | Clark et al. | 709/203 |
| 6,092,196 A * | 7/2000 | Reiche | 726/6 |
| 6,112,183 A | 8/2000 | Swanson et al. | 705/2 |
| 6,119,227 A * | 9/2000 | Mao | 713/171 |
| 6,141,759 A | 10/2000 | Braddy | 713/201 |
| 6,167,523 A | 12/2000 | Strong | 713/201 |
| 6,170,017 B1 * | 1/2001 | Dias et al. | 709/235 |
| 6,178,416 B1 | 1/2001 | Thompson et al. | 707/3 |
| 6,189,036 B1 * | 2/2001 | Kao | 709/229 |
| 6,189,146 B1 * | 2/2001 | Misra et al. | 717/177 |
| 6,226,752 B1 | 5/2001 | Gupta et al. | 726/9 |
| 6,253,228 B1 | 6/2001 | Ferris et al. | 709/203 |
| 6,263,330 B1 | 7/2001 | Bessette | 707/4 |
| 6,275,941 B1 * | 8/2001 | Saito et al. | 26/2 |
| 2,952,796 A1 | 9/2001 | Drucker et al. | 707/4 |
| 6,334,778 B1 | 1/2002 | Brown | 273/429 |
| 6,339,830 B1 * | 1/2002 | See et al. | 726/15 |
| 6,347,374 B1 | 2/2002 | Drake et al. | 713/200 |
| 6,362,836 B1 * | 3/2002 | Shaw et al. | 715/744 |
| 6,385,611 B1 | 5/2002 | Cardona | 707/6 |
| 6,401,072 B1 | 6/2002 | Haudenschild et al. | 705/3 |
| 6,449,598 B1 | 9/2002 | Green et al. | 705/2 |
| 6,691,232 B1 * | 2/2004 | Wood et al. | 726/6 |
| 6,701,438 B1 * | 3/2004 | Prabandham et al. | 726/11 |
| 6,728,884 B1 * | 4/2004 | Lim | 726/12 |
| 6,775,782 B1 * | 8/2004 | Buros et al. | 726/2 |
| 6,826,696 B1 | 11/2004 | Chawla et al. | 713/201 |
| 6,842,896 B1 * | 1/2005 | Redding et al. | 717/172 |
| 6,874,090 B2 * | 3/2005 | See et al. | 726/13 |
| 6,983,377 B1 * | 1/2006 | Beesley et al. | 726/12 |
| 7,032,022 B1 | 4/2006 | Shanumgam et al. | 709/225 |
| 7,035,918 B1 | 4/2006 | Redding et al. | 709/223 |
| 7,062,781 B2 * | 6/2006 | Shambroom | 726/10 |
| 2001/0054101 A1 * | 12/2001 | Wilson | 709/225 |
| 2002/0010865 A1 * | 1/2002 | Fulton et al. | 713/201 |
| 2002/0040441 A1 * | 4/2002 | See et al. | 713/202 |
| 2003/0074584 A1 * | 4/2003 | Ellis | 713/201 |
| 2005/0138204 A1 * | 6/2005 | Iyer et al. | 709/242 |

* cited by examiner

SYSTEM AND METHOD FOR DELEGATING A USER AUTHENTICATION PROCESS FOR A NETWORKED APPLICATION TO AN AUTHENTICATION AGENT

PRIORITY CLAIM

This application is a continuation of U.S. patent application Ser. No. 09/626,339 filed Jul. 26, 2000 now abandoned, entitled SYSTEM AND METHOD FOR DELEGATING A USER AUTHENTICATION PROCESS FOR A NETWORKED APPLICATION TO AN AUTHENTICATION AGENT, which is hereby incorporated by reference in its entirety for each of its teachings and embodiments.

This application claims benefit of priority of U.S. provisional application Ser. No. 60/158,939 titled "System and Method for Delegating a User Authentication Process for a Networked Application to an Authentication Agent" filed Oct. 12, 1999, whose inventors were Fel Bautista, Steve Lemon, and Rajeev Chawla.

FIELD OF THE INVENTION

The present invention relates to the field of networked applications, and more particularly to user authentication for networked applications.

DESCRIPTION OF THE RELATED ART

In the field of computer security, the term "authentication" refers to the process of verifying the identity of a user attempting to gain access to a computing resource or system. Authentication methods generally require the user to provide some type of information. For example, a user may be required to provide a password, provide biometric data such as a retinal scan, provide personal data such as a handwriting sample, provide a number computed based on a synchronized clock in the user's possession, etc. What then occurs with the provided information varies for different authentication protocols. For example, the user's password may be sent to the system in encrypted form, the user's password may be used as a variable in a mathematical function to compute a value which is then sent to the system, etc.

The issue of authentication may be considered at different levels. For example, authentication may be considered at a system level, such as when a system such as a Windows NT or Unix system verifies that a user attempting to logon has a valid user account and has provided a valid password. Authentication may also be considered at the application level. For example, when a user attempts to launch or access a particular application, the application may present a login screen asking the user to provide a username and password.

One of the great advantages of the proliferation of common networking technologies, such as Internet browsers, is that users may access networked applications from virtually anywhere. Of course, this also means that the networked applications are highly exposed to unauthorized users. Thus, it is very common today for networked applications, such as Internet-based applications, to include authentication processes for users attempting to access the applications.

Currently, most networked applications with authentication processes implement the authentication processes independently of other systems or applications. In other words, authentication information for each user is persistently stored on the server side of the networked application, e.g., by maintaining a server-side database including user authentication information. Upon receiving a user request to launch or access the application, this server-side authentication information may be checked against information dynamically provided by the user, e.g., a password, and authorization may be granted or denied based on the results of this check.

However, there are several problems associated with this approach for performing application-level user authentication. For example, since each application generally maintains its own set of user authentication information, users may have to remember and provide different login information, e.g., different usernames or passwords, for different applications. For example, many networked applications assign login information on a first-come-first-serve basis, e.g., by providing an online registration form in which users choose their own usernames. In this example, a user may desire to use a common username for different applications, but may be forced to choose another username because the desired one is already taken. Also, the user may be forced to choose an unfamiliar password to access an application, e.g., because the password he normally uses does not satisfy the application's rules for password construction. Thus, it would be desirable to provide a system and method for enabling networked applications to avoid storing their own independent set of user authentication information.

Another problem associated with the approach described above is that user authentication information may be stored in many different places by many different applications using many different methods, which results in a significant security risk. For example, as described above, users may attempt to reuse common information, such as usernames and passwords, to access several different systems or applications. If the security of any one of these systems or applications is compromised then the stored user authentication information could be improperly used not only to access personal user information in the compromised system or application, but also to access personal user information in many other systems or applications. Thus, it would be desirable to provide a system and method that minimizes the storage points of sensitive user authentication information.

Another drawback associated with the approach described above is that the application developers may have to implement the authentication processes themselves for their applications. This may represent a significant development effort, depending on the size of the user base, the desired level of security, the underlying computing platform the application runs on, etc. The result may be an increase in development costs, a delay in bringing an application to market, security flaws due to developers who are unfamiliar with computer security issues, etc. Thus, it would be desirable to provide a system and method for delegating user authentication procedures to a separate authentication agent.

SUMMARY OF THE INVENTION

The problems outlined above may in large part be solved by providing systems and methods relating to user authentication for networked applications, such as described herein. A networked application may request a user to provide authentication information in order to access the application. For example, the application may request the user to type in a username and password, the application may request some type of biometric information from the user, such as a fingerprint scan, or the application may request the user to provide another type of authentication information. Upon receiving this authentication information from the user, the client side of the networked application sends the information to the server side of the networked application, possibly in an encrypted form, using any of various methods or protocols.

For example, the client side of the application may coordinate with the server side of the application in order to send the information using cleartext methods, hashed password methods, challenge-response methods, etc.

Upon receiving the authentication information that the user provided to the client side of the networked application, the server side of the networked application may proceed in various ways in order to authenticate the user. In one embodiment, the server side of the application determines an appropriate authentication agent associated with the user to delegate the authentication process to. For example, for each application user, the server side of the application may maintain information associated with the user, such as the user's employer. The application may then match this employer information to an authentication agent running in the employer's network domain, and the authentication process may then be delegated to this authentication agent. The user authentication information that the user provided to the application may be passed to the authentication agent, and the authentication agent may use the information in attempting to authenticate the user. In one example, the user may provide to the application the same username and password that he uses to log in to his employer's system. The application may then pass on the username and password to an authentication agent running in the user's employer's domain. The authentication agent running in the user's employer's domain may then use the username and password in order to attempt to authenticate the user, e.g. by communicating with the employer's system or the system's authentication services in order to authenticate the user. The authentication agent may then communicate the results of its authentication attempt to the server side of the application, which may then act accordingly, e.g. by authorizing the user to use the application or by displaying an error message.

In one embodiment, the server side of the application communicates with one central, trusted authentication agent for each user. For example, a global authentication service may store user authentication credentials for users of various systems and applications and may accept client requests to verify received authentication information against the stored authentication credentials.

In one embodiment, the server side of the application may store its own authentication credentials for certain users. The server side of the application may first check to see if it stores authentication credentials for the user in question. If so, the application may use its own stored information to attempt to authenticate the user. If not, the application may delegate the authentication process to an authentication agent, as described above. Of course, the embodiments described above may be combined in various ways. For example, the server side of the application may store its own authentication information for certain users, may store information mapping users to a specific authentication agent for certain other users, and may rely on a default central authentication agent to authenticate the remaining users. Administration tools may be included for mapping users to authentication agents.

BRIEF DESCRIPTION OF THE DRAWINGS

A better understanding of the present invention can be obtained when the following detailed description of the preferred embodiment is considered in conjunction with the following drawings, in which.

Figure 1A:
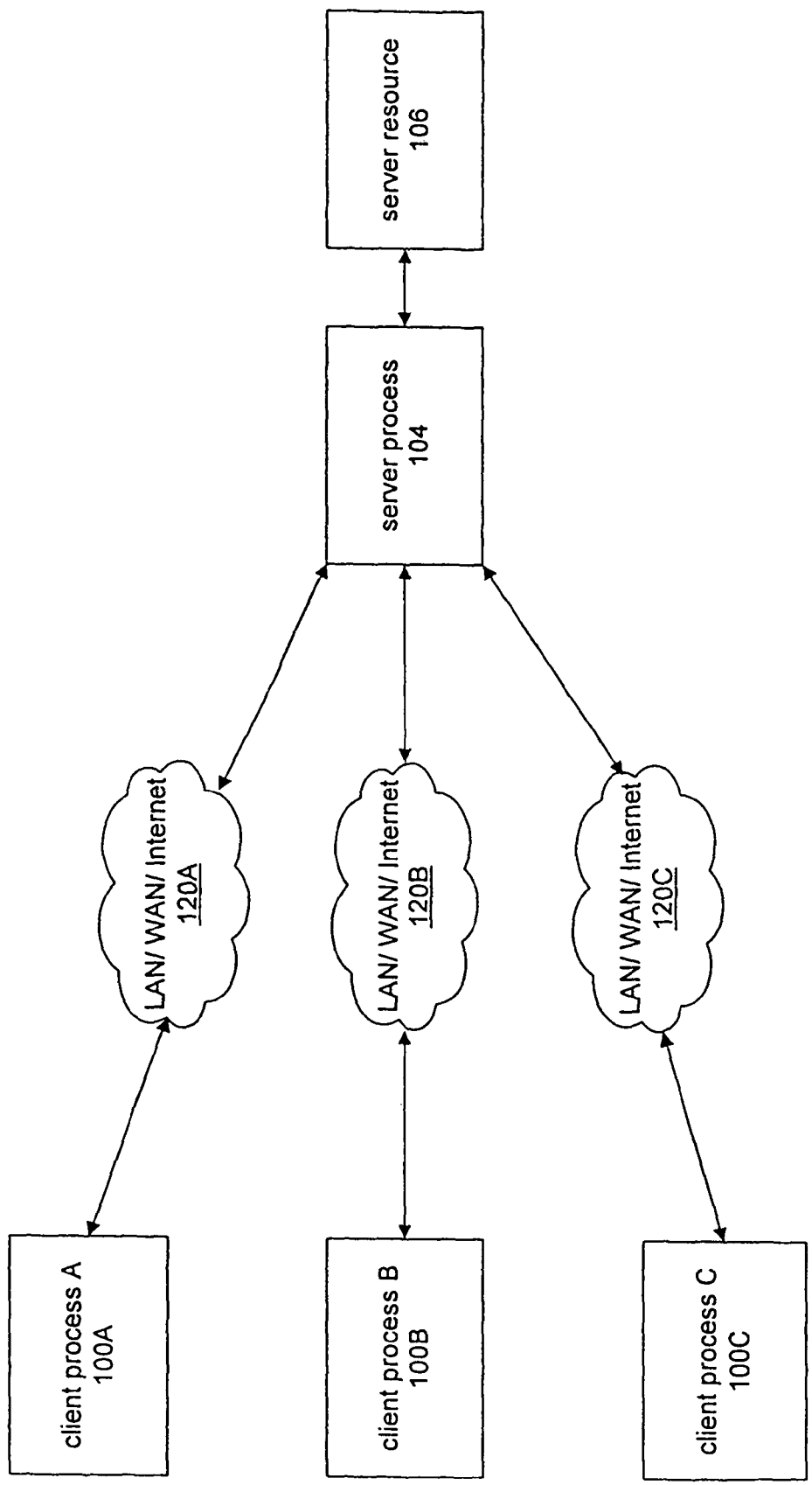
FIG. 1 illustrates exemplary networked applications.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following reference is hereby incorporated by reference in its entirety as though fully and completely set forth herein:

U.S. patent application Ser. No. 09/626,341 titled "System and Method for Integrating Internet-Based Healthcare Applications" filed Jul. 26, 2000, whose inventors were Fel Bautista, Marco Framba, Venkateshwar Talla, Rajeev Chawla, Rajdeep Gupta, Jeff Nelson, and Steven Lemon.

FIG. 1—Exemplary Networked Application

FIG. 1A illustrates an exemplary networked application. It is noted that FIG. 1A represents one embodiment of a networked application, and various other embodiments are possible.

In FIG. 1A; the networked application is illustrated as a client/server application comprising a client side and a server side. Each client process 100 communicates with a server process 104 via a network 120. The client processes 100 and the server process 104 may be associated with any type of application program or computing service. For example, a client process may communicate with a server process to perform a high-level operation such as an electronic commerce transaction, or the client and server processes may work together to perform a lower-level operation, such as printing a document, etc. The server process 104 typically interacts with some type of server-side resource 106 on behalf of a client process. For example, the server process 104 may retrieve information from or store information to a server-side database 106.

Each of the client processes 100 may run in any type of client-side environment. For example, a client process may run in a desktop computer or workstation running any of various operating systems, such as Windows, Mac OS, Unix, etc., or a client process may run in a portable computing device, such as a personal data assistant, smart cellular phone, etc. Any number of clients 100 may communicate with the server 104, depending on the type of application running on the system and the resources available to the server, such as network connection speed, processing power, etc.

Each of the clients 100 may be connected to the server 104 through any of various types of networks 120, e.g., via a direct connection, LAN, WAN, Intranet, Internet, etc., or any combination of these. Each client may use a network connection as a communication channel to send requests and receive responses over the network 120. Any of various types of network protocols may be used to send messages across the network. As messages are sent across the network, the messages may pass through various gateways, network routers, etc. Each client's network connection may be a connection of any type, such as a PPP or SLIP dialup link, an Ethernet or token ring connection, an ISDN connection, a cable modem connection, any of various types of wireless connections, etc.

Figure 1B:
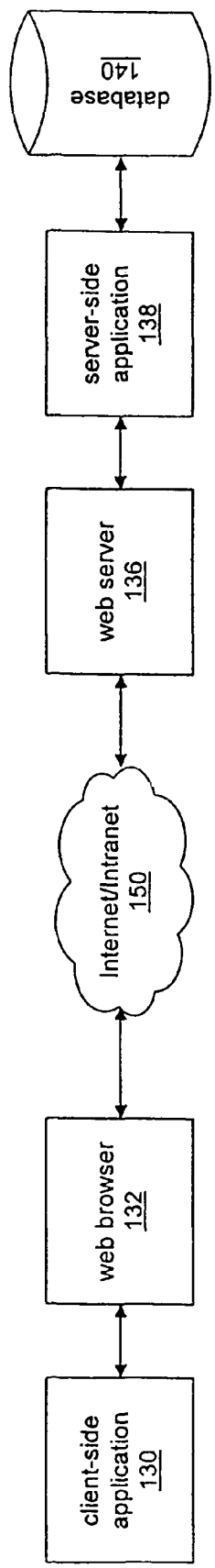

Networked applications may be web-based applications or may include web-browsing functionality. FIG. 1B illustrates one embodiment of a networked application with web-browsing capabilities. There are, of course, many possible variations in webbased application architectures, and FIG. 1B is exemplary only.

As shown in FIG. 1B, the client-side of the networked application may comprise a web browser 132 and application-specific client code 130. The application-specific client code 130 may comprise code packaged in various forms that operate under control of the browser 132, such as Java applets or ActiveX components. The application-specific client code 130 may also use the web browser 132 as a component. For example, the Internet Explorer web browser from Microsoft Corporation exposes an ActiveX/COM interface enabling applications to use Internet Explorer as an embedded component.

Figure 1C:
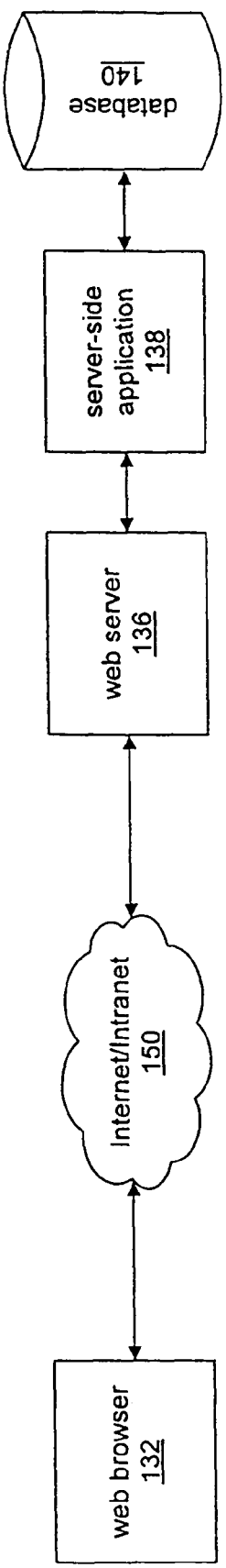

Web-enabled networked applications often comprise client-side code 130 which takes advantage of the familiar interface and popularity of web browsers, utilizing them to handle the user interface/presentation portions of an application, and often the network communication needs as well. However, it is noted that the client-side of a networked application may also run entirely within a web browser 132. For example, a networked application may utilize web pages comprising browser-supported elements such as HTML, XML, Javascript, etc., without relying on additional client-side code 130. FIG. 1C illustrates one such embodiment of a thin-client, browser-only client side.

The web browser 132 may communicate across a network 150, such as the Internet or an Intranet, with a web server 136. Depending on the application and the request, the web server 136 may broker client application requests to server-side application code 138 for processing, e.g., through interfaces such as CGI, ISAPI, NSAPI, etc. Server-side application code 138 may execute on one or more separate application servers and may interface with one or more server-side databases 140.

As described above, many networked applications include authentication processes requiring users to provide authentication information in order to access the application. The authentication information may be requested in any of various ways, as appropriate to the application. For example, an application may present a login screen to the user when the application is launched, or a web-based application may present a login screen to the user when the user attempts to access a web page associated with the application, etc.

As discussed in more detail below, the application may then pass the authentication information to an authentication agent in order to authenticate the user.

Figure 2:
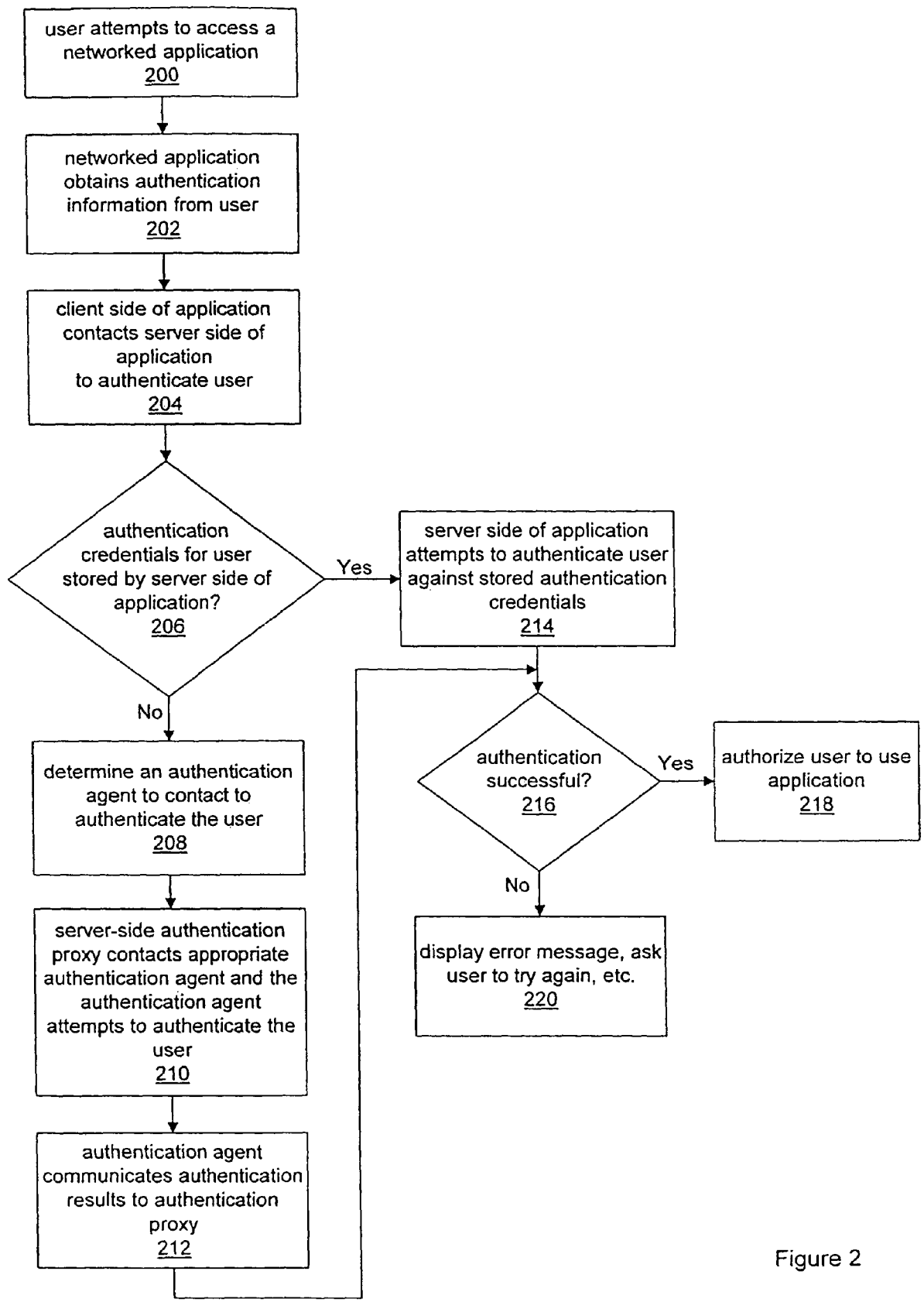
FIG. 2 is a flowchart diagram illustrating one embodiment of a user authentication process involving an authentication agent.

FIG. 2—Delegating User Authentication to an Authentication Agent

FIG. 2 is a flowchart diagram illustrating one embodiment of a user authentication process involving an authentication agent.

In step 200 of FIG. 2, a user attempts to access a networked application. As discussed above with reference to FIG. 1, the networked application may be an application for any purpose, and may have various architectures. Thus, a user may attempt to access the networked application in various ways, as appropriate for a particular system or application. For example, a user may attempt to access a web-based application by accessing a uniform resource locator (URL) associated with the application, e.g., by providing the URL to a web browser. For other types of networked applications, step 200 may differ. For example, the user may attempt to access a networked application by dialing in to the application through a modem, etc.

In step 202 of FIG. 2, the networked application obtains authentication information from the user. An application may request any of various types of authentication information, such as a username and password, biometric information, information based on some item in the user's possession, such as a synchronized clock, or any other type of authentication information. The application may request the authentication information in any of various ways, as appropriate to the particular application, the type of authentication information being requested, etc. For example, the application may present a form or window for the user to provide text-based information, the application may interface with a hardware device to request biological information, etc.

In step 204 of FIG. 2, the client side of the networked application contacts the server side of the networked application in order to authenticate the user. The client side of the networked application may pass the authentication information obtained from the user in step 202 to the server side of the networked application. The authentication information may be passed in various forms, e.g., the information may be encrypted, digitally signed, etc. The client side and the server side of the networked application may communicate using any of various communication protocols. For example, the client side and server side may use the Secure Sockets Layer (SSL) standard protocol, other TCP/IP-based protocols, etc., for communication.

As shown in step 206 of FIG. 2, in one embodiment the server side of the networked application may determine whether the server side of the application stores authentication credentials for the user that can be used for authenticating the user. For example, the networked application may be a healthcare application that enables users to perform healthcare-related operations, such as accessing medical journals, viewing the status of their health insurance claims, etc. In this example, particular groups, such as employers or organizations, may coordinate with the healthcare application administrator in order to enable each group member, such as each employee, to access the application. In this case, the server side of the healthcare application may not store authentication credentials for users who are members of such groups, but may delegate the authentication process to an authentication agent associated with the user's group, as explained in more detail below.

However, the healthcare application may also allow independent users to access the application, e.g., by purchasing a subscription, etc. In this case, the server side of the application may itself store the user's authentication credentials, and the networked application itself may perform the authentication process for these types of users, rather than delegating the authentication process to an authentication agent. Of course, there are many other scenarios that may make it desirable for a networked application to store authentication credentials for only a portion of its users. Also, it is noted that in one embodiment, the application does not store authentication credentials for any of its users, but always delegates the authentication process to authentication agents.

The networked application may determine whether authentication credentials for the user are maintained by the application itself in any of various ways. For example, the application may maintain a database comprising user information, wherein information for each user can be accessed using a key that the user provides in step 202, such as a username, etc. In this example, the application may then access the user's records in the database and determine from the records whether or not the authentication credentials, such as the user's password, are stored by the application.

If the server side of the networked application determines in step 206 that the application does not maintain authentication credentials for the user, then in step 208 of FIG. 2, the server side of the networked application determines an appropriate authentication agent to contact for authenticating the user. For example, as discussed above, a user may be associated with a particular employer, and the employer may have an associated authentication agent running on one of the employer's servers. The appropriate authentication agent may be determined in various ways. For example, as described above, the server side of the networked application may maintain a database of user information that may be accessed based on a key, such as the user's username or another key that the user provides in step 202, and the application may access this database to determine the appropriate authentication agent associated with the user. The information regarding authentication agents may be stored or specified in various ways. For example, network addresses, such as IP addresses or port numbers, may be stored for each authentication agent, parameters associated with each authentication agent may be stored, etc.

In step 210 of FIG. 2, the server side of the networked application contacts the appropriate authentication agent in order to authenticate the user. In one embodiment, the server side of the application may interface with a separate process or thread referred to as an authentication proxy, which is responsible for communicating with the authentication agent. The authentication proxy may pass the authentication information obtained from the user in step 202 to the authentication agent, and the authentication agent may then use the information in whatever way is appropriate to attempt to authenticate the user.

In one embodiment, the authentication agent interfaces with a network operating system, such as a Windows NT system, Unix system, etc., and carries out an authentication process with the system. For example, as described above, the authentication agent may be associated with a particular company or organization. The authentication agent may interface with the company or organization's computer system, e.g., in order to verify that a username and password that the user provided in step 202 is a valid username/password combination for the computer system. As is well known in the art, there are various ways in which such an authentication agent may interface with a system to perform an authentication procedure.

Other embodiments are also contemplated, in which the authentication agent interfaces with various other types of systems or applications. For example, the networked application may be a networked application A that is associated with another networked application B. Networked application B may maintain user authentication credentials for users that are common to both application A and application B, and application A may delegate the authentication process for these common users to an authentication agent associated with application B, whenever such a user attempts to access application A.

Also, in one embodiment the networked application may communicate with a central, trusted authentication agent to authenticate a portion of or all of the application users. For example, this authentication agent may be associated with a central, trusted computer security service provider who stores information such as user passwords, user encryption keys, etc., and provides services such as user authentication services to many systems or applications. In this example, the application may first check to see that the claimed user is a valid user of the application, e.g., by checking the user's username or other identifying key against a set of subscribed application users, and the application may then delegate the task of verifying the user's identity to the central authentication agent.

In step 212 of FIG. 2, the authentication agent returns the results of the authentication process performed in step 210 to the authentication proxy, e.g., whether or not the user was successfully authenticated against his authentication credentials, possibly along with an error or status message, etc. The authentication proxy and the authentication agent preferably exchange information in encrypted form, using a secure protocol. Any of various communication protocols may be used to communicate between the proxy and the agent, such as the standard secure sockets layer (SSL) protocol, other TCP/IP-based protocols, etc. It is noted that different authentication agents may communicate with the server side of the networked application using different communication protocols, message formats, etc. Thus, the server side of the application may be constructed according to a modular architecture that allows multiple authentication proxies to be incorporated into the application. From step 212, the flowchart logic proceeds to step 216 of FIG. 2.

If the server side of the networked application determines in step 206 that the application does store authentication credentials for the user, then in step 214 of FIG. 2, the server side of the networked application uses the stored authentication credentials to attempt to authenticate the user. The server side of the application may verify the authentication information provided by the user in step 202 against the authentication credentials in any of various ways, depending on the type of credentials, how the credentials are stored, etc. From step 214, the flowchart logic proceeds to step 216 of FIG. 2.

In step 216 of FIG. 2, the server side of the networked application interprets the results of the authentication process performed in step 210 or step 214. If the authentication was successful, then in step 218 of FIG. 2, the application authorizes the user to access the application. Step 218 may take on various forms depending on the type of application, the level of authorization granted to the user, etc. For example, for a web-based application, step 218 may involve returning an HTTP cookie to the user's web browser, where the cookie is used to enable the user to perform subsequent requests to interact with the application.

If the authentication process in step 210 or 214 was unsuccessful, then in step 220 of FIG. 2, the application behaves accordingly. For example, the application may display an error message, may ask the user to re-submit his authentication information, etc.

As noted above, FIG. 2 represents one embodiment of a user authentication process involving an authentication agent. Thus, the flowchart of FIG. 2 is exemplary, and various steps may be combined, omitted, added, or modified as required or desired for different systems or applications. For example, steps 206 and 214 may be omitted if the application does not store its own authentication credentials for any users. As another example, communication steps may be combined in some embodiments. For example, some communication protocols, such as various cryptographic protocols, involve passing information between a sender and a receiver in a stepped, iterative manner.

Application Integration

The system and method described herein may be applied for any of various types of applications. The above-incorporated patent application, titled, "System and Method for Integrating Internet-Based Healthcare Applications," describes a system and method for integrating independent Internet-based applications via an application shell. A user may access a master server environment, providing authentication information, and may receive data for implementing an application shell, e.g., an application shell which runs within the environment of a web browser. The application shell may include a graphical user interface and other means for integrating a set of networked applications. For example, a group of healthcare-related applications, such as an application for accessing online medical journals, an application for filing health insurance claims, an application for ordering laboratory results, etc., may be integrated via the application shell. The integration provided by the application shell may include such capabilities as single sign-on authentication, application context-sharing, etc.

In various embodiments, the present invention may be utilized in order to delegate the authentication process for accessing the application shell and/or accessing the applications accessible via the application shell to an authentication agent.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for authenticating a particular user of a networked application, wherein the networked application has a client side and a server side, the method implemented by the server side of the networked application and comprising:
    receiving authentication information for said particular user from the client side of the networked application;
    storing information about a plurality of users, a plurality of groups, and a plurality of authentication agents, wherein said particular user is one of said plurality of users and the stored information indicates which of the plurality of users are members of which of the plurality of groups and which of the plurality of authentication agents are associated with which of the plurality of groups;
    using the authentication information received from the client side of the networked application to access the stored information to identify in which of the plurality of groups said particular user is a member and to identify which of the plurality of authentication agents is associated with the identified group;
    passing the authentication information to the identified authentication agent that is associated with the identified group in which said particular user is a member;
    receiving from the identified authentication agent results of an authentication attempt by the identified authentication agent; and
    authorizing the user of the networked application to access the networked application if the authentication attempt was successful.

2. The method of claim 1, wherein the authentication information passed to the authentication agent comprises account information for said particular user of the networked application.

3. The method of claim 2, wherein the account information for said particular user of the networked application comprises a username and password.

4. The method of claim 1, wherein the group in which said particular user of the networked application is a member is the particular user's employer.

5. The method of claim 2, wherein the network computer system is a network computer system from the group consisting of: a Windows NT system and a Unix system.

6. The method of claim 1, further comprising:
    before accessing the resource, determining whether the server side of the networked application stores authentication credentials for said particular user of the networked application;
    if authentication credentials for said particular user of the networked application are not stored by the server side of the networked application, proceeding with authentication by finding the appropriate authentication agent.

7. A computer system for authenticating a particular user of a networked application, said networked application having a sever side and a client side, the computer system implementing the server side of the networked application and comprising: one or more hardware computers including a hardware memory system;
    storing code which when run by the one or more hardware computers causes the computer system to:
    receive authentication information for said particular user from the client side of the networked application;
    access stored information about a plurality of users, a plurality of groups, and a plurality of authentication agents, wherein said particular user is one of said plurality of users and the stored information indicates which of the plurality of users are members of which of the plurality of groups and which of the plurality of authentication agents are associated with which of the plurality of groups;
    use the authentication information received from the client side of the networked application and the stored information to identify in which of the plurality of groups said particular user is a member and to identify which of the plurality of authentication agents is associated with the identified group;
    pass the authentication information to the identified authentication agent that is associated with the identified group in which said particular user is a member;
    receive from the identified authentication agent results of an authentication attempt by the identified authentication agent; and
    authorize the user of the networked application to access the networked application if the authentication attempt was successful.

8. The system of claim 7, wherein the authentication information passed to the authentication agent comprises account information for said particular user of the networked application.

9. The system of claim 8, wherein the account information for said particular user of the networked application comprises a username and password.

10. The system of claim 7, wherein the group of which said particular user of the networked application is a member is the particular user's employer.

11. The system of claim 8, wherein the one or more hardware computers is from the group consisting of: a Windows NT system and a Unix system.

12. The system of claim 7, further comprising a memory storing authentication credentials for the plurality of users; wherein the code stored on the hardware memory system further causes the computer system to:
    access the memory in order to determine whether the memory stores authentication credentials for said particular user of the networked application;

attempt to authenticate the user of the networked application using the stored authentication credentials for said particular user of the networked application if authentication credentials for said particular user are stored on the memory; and pass the authentication information to the authentication agent in order to authenticate said particular user of the networked application if authentication credentials for said particular user of the networked application are not stored on the memory.

13. The method of claim 1, wherein the authentication information for said particular user does not explicitly identify in which of the plurality of groups said particular user is a member.

14. The system of claim 7, wherein the authentication information for said particular user does not explicitly identify in which of the plurality of groups said particular user is a member.

* * * * *